United States Patent
Crescitelli et al.

(10) Patent No.: US 11,954,600 B2
(45) Date of Patent: Apr. 9, 2024

(54) IMAGE PROCESSING DEVICE, IMAGE PROCESSING METHOD AND IMAGE PROCESSING SYSTEM

(71) Applicant: Hitachi, Ltd., Tokyo (JP)

(72) Inventors: Viviana Crescitelli, Tokyo (JP); Takashi Oshima, Tokyo (JP)

(73) Assignee: HITACHI, LTD., Tokyo (JP)

( * ) Notice: Subject to any disclaimer, the term of this patent is extended or adjusted under 35 U.S.C. 154(b) by 464 days.

(21) Appl. No.: 17/203,785

(22) Filed: Mar. 17, 2021

(65) Prior Publication Data

US 2021/0334580 A1 Oct. 28, 2021

(30) Foreign Application Priority Data

Apr. 23, 2020 (JP) .................. 2020-076511

(51) Int. Cl.
*G06N 3/088* (2023.01)
*G06F 18/214* (2023.01)
(Continued)

(52) U.S. Cl.
CPC ........... *G06N 3/088* (2013.01); *G06F 18/214* (2023.01); *G06F 18/253* (2023.01); *G06N 3/08* (2013.01);
(Continued)

(58) Field of Classification Search
CPC .......... G06N 3/088; G06N 3/08; G06N 3/045; G06N 3/047; G06N 3/084; G06N 3/04; G06N 3/0464; G06N 3/0455; G06N 3/09; G06F 18/214; G06F 18/253; G06F 18/24; G06F 18/251; G06F 18/213; G06F 18/2413; G06V 10/774; G06V 10/806; G06V 10/82; G06V 10/764; G06V 10/454; G06V 10/7715; G06V 10/803; G06V 10/26; G06V 10/776; G06V 10/80; G06V 20/20;
(Continued)

(56) References Cited

U.S. PATENT DOCUMENTS 10,223,611 B1 * 3/2019 Price ....................... G06F 18/10
10,810,725 B1 * 10/2020 Dolhansky ........... G06V 10/764
(Continued)

OTHER PUBLICATIONS

Japanese Office Action received in corresponding Japanese Application No. 2020-076511 dated Dec. 12, 2023.
(Continued)

*Primary Examiner* — Michael S Osinski
(74) *Attorney, Agent, or Firm* — MATTINGLY & MALUR, PC

(57) ABSTRACT

An image processing device including a storage unit configured to store an object detection neural network trained using a first K-channel image generated from a first M-channel image and a first N-channel image generated from the first M-channel image, a reception unit configured to receive, from a sensor, a second M-channel image and a second N-channel image that include an identical subject, and an image analysis unit configured to generate, using the object detection neural network trained using the first K-channel image, object detection result information with respect to a second K-channel image generated from the second M-channel image and the second N-channel image, and output the object detection result information.

7 Claims, 15 Drawing Sheets

(51) Int. Cl.
*G06F 18/25* (2023.01)
*G06N 3/08* (2023.01)
*G06V 10/774* (2022.01)
*G06V 10/80* (2022.01)

(52) U.S. Cl.
CPC .......... *G06V 10/774* (2022.01); *G06V 10/806* (2022.01)

(58) Field of Classification Search
CPC . G06T 2207/20084; G06T 2207/20081; G06T 11/00; G06T 2207/10024; G06T 2207/20221
See application file for complete search history.

(56) References Cited

U.S. PATENT DOCUMENTS

| | | | |
|---|---|---|---|
| 10,929,676 B2* | 2/2021 | Vaezi Joze | G06V 20/46 |
| 11,210,831 B2* | 12/2021 | Swaminathan | G06V 10/82 |
| 11,455,793 B2* | 9/2022 | Campos Macias | G06V 10/764 |
| 11,593,632 B2* | 2/2023 | Rippel | G06V 30/19173 |
| 11,756,163 B2* | 9/2023 | Pope | G06T 5/00 382/167 |
| 11,783,231 B2* | 10/2023 | Heide | G06T 5/50 382/157 |
| 11,783,461 B2* | 10/2023 | Lu | G06T 11/001 382/156 |
| 2007/0237387 A1 | 10/2007 | Avidan et al. | |
| 2018/0053293 A1* | 2/2018 | Ramalingam | G06T 7/33 |
| 2019/0101605 A1* | 4/2019 | Hyun | G01R 33/5608 |
| 2019/0251401 A1* | 8/2019 | Shechtman | G06V 10/82 |
| 2020/0065619 A1* | 2/2020 | Liu | G06N 3/045 |
| 2020/0143169 A1* | 5/2020 | Vaezi Joze | G06N 3/088 |
| 2020/0250468 A1* | 8/2020 | Kim | G06V 10/80 |
| 2020/0250514 A1* | 8/2020 | Kim | G06F 18/251 |
| 2020/0302149 A1* | 9/2020 | Gottemukkula | G06N 3/084 |
| 2020/0372686 A1* | 11/2020 | Wen | H04N 19/136 |
| 2020/0380366 A1* | 12/2020 | Wang | G06F 18/241 |
| 2021/0031507 A1* | 2/2021 | Haik | G06N 3/08 |
| 2021/0201532 A1* | 7/2021 | Cai | G06T 7/74 |
| 2021/0224993 A1* | 7/2021 | Tian | G06V 10/143 |
| 2021/0256281 A1* | 8/2021 | Henson | G06V 40/16 |
| 2021/0295483 A1* | 9/2021 | Huang | G06T 5/50 |
| 2021/0342629 A1* | 11/2021 | Hu | G06F 18/253 |
| 2021/0365716 A1* | 11/2021 | Li | G06V 10/764 |
| 2021/0366123 A1* | 11/2021 | Wang | G06V 10/82 |
| 2021/0407041 A1* | 12/2021 | Liu | G06T 3/4046 |
| 2022/0014684 A1* | 1/2022 | Zhou | H04N 23/632 |
| 2022/0084163 A1* | 3/2022 | Lu | G06T 7/70 |
| 2022/0099954 A1* | 3/2022 | Visscher | G06N 3/08 |
| 2022/0172496 A1* | 6/2022 | Wilkinson, Jr. | G06F 18/214 |
| 2022/0188975 A1* | 6/2022 | Watanabe | G06T 3/4053 |
| 2022/0237790 A1* | 7/2022 | Ma | G06V 20/698 |
| 2022/0277549 A1* | 9/2022 | Ghafoorian | G06V 20/56 |
| 2022/0309719 A1* | 9/2022 | Ko | G06T 11/006 |
| 2022/0319020 A1* | 10/2022 | Ding | G06N 3/0464 |
| 2022/0319155 A1* | 10/2022 | Lu | G06V 10/26 |
| 2023/0011053 A1* | 1/2023 | Ando | G06N 3/045 |
| 2023/0196801 A1* | 6/2023 | Li | G06T 7/593 382/154 |

OTHER PUBLICATIONS

Shopovska, I. et al., "Deep Visible and Thermal Image Fusion for Enhanced Pedestrian Visibility", Sensors 2019, Aug. 28, 2019, pp. 1-21.

Cygert, S. et al., "Style Transfer for Detecting Vehicles with Thermal Camera", IEEE SPA 2019, Sep. 18-20, 2019, pp. 1-6.

* cited by examiner

IMAGE PROCESSING DEVICE, IMAGE PROCESSING METHOD AND IMAGE PROCESSING SYSTEM

CROSS-REFERENCE TO RELATED APPLICATIONS

The present application claims priority to Japanese Patent Application No. 2020-076511, filed Apr. 23, 2020. The contents of this application are incorporated herein by reference in their entirety.

BACKGROUND OF THE INVENTION

The present invention relates to an image processing device, an image processing method, and an image processing system.

SUMMARY OF THE INVENTION

In recent years, with the progress of IT, large numbers of sensors have been arranged throughout society, and extremely large amounts of data are accumulated. Against this background, various measures for utilizing accumulated image data have been considered. In particular, as the amount of video content such as photos, videos, images, and the like increases, there is an increasing need to freely detect and accurately identify the objects in videos.

Object detection neural networks that utilize deep learning are known as one means of object detection. By using object detection neural networks, it becomes possible to determine the category and the region of each object in a target image with high accuracy, and these object detection neural networks have been applied to a wide variety of fields.

For example, US2007/0237387A1 (Patent Document 1) describes a technique in which "A method and system is presented for detecting humans in images of a scene acquired by a camera. Gradients of pixels in the image are determined and sorted into bins of a histogram. An integral image is stored for each bin of the histogram. Features are extracted from the integral images, the extracted features corresponding to a subset of a substantially larger set of variably sized and randomly selected blocks of pixels in the test image. The features are applied to a cascaded classifier to determine whether the test image includes a human or not."

According to the technique described in Patent Document 1, it is possible to determine whether or not a human is present in an image by analyzing features of a target image.

However, in the technique described in Patent Document 1, since the target image to be processed is a single source image such as an RGB image or the like acquired from a camera, when the photographing environment in which the image is photographed is dark, for example, the information that can be acquired by the RGB camera becomes limited, and the accuracy of the object detection may become insufficient.

It is therefore an object of the present invention to provide object detection results with high accuracy for images photographed under various lighting conditions by fusing a plurality of images of different types (for example, an RGB image and an infrared image), and performing object detection using an object detection neural network trained based on the fused image.

In order to solve the above problems, one representative image processing device according to the present invention includes a storage unit configured to store an object detection neural network trained using a first K-channel image generated from a first M-channel image and a first N-channel image generated from the first M-channel image, a reception unit configured to receive, from a sensor, a second M-channel image and a second N-channel image that include an identical subject, and an image analysis unit configured to generate, using the object detection neural network trained using the first K-channel image, object detection result information with respect to a second K-channel image generated from the second M-channel image and the second N-channel image, and output the object detection result information.

According to the present invention, it is possible to provide object detection results with high accuracy for images photographed under various lighting conditions by fusing a plurality of images of different types (for example, an RGB image and an infrared image), and performing object detection using an object detection neural network trained based on the fused image.

Other problems, configurations and effects other than those described above will be made clear by the following description of embodiments for carrying out the invention.

DETAILED DESCRIPTION

Figure 1:
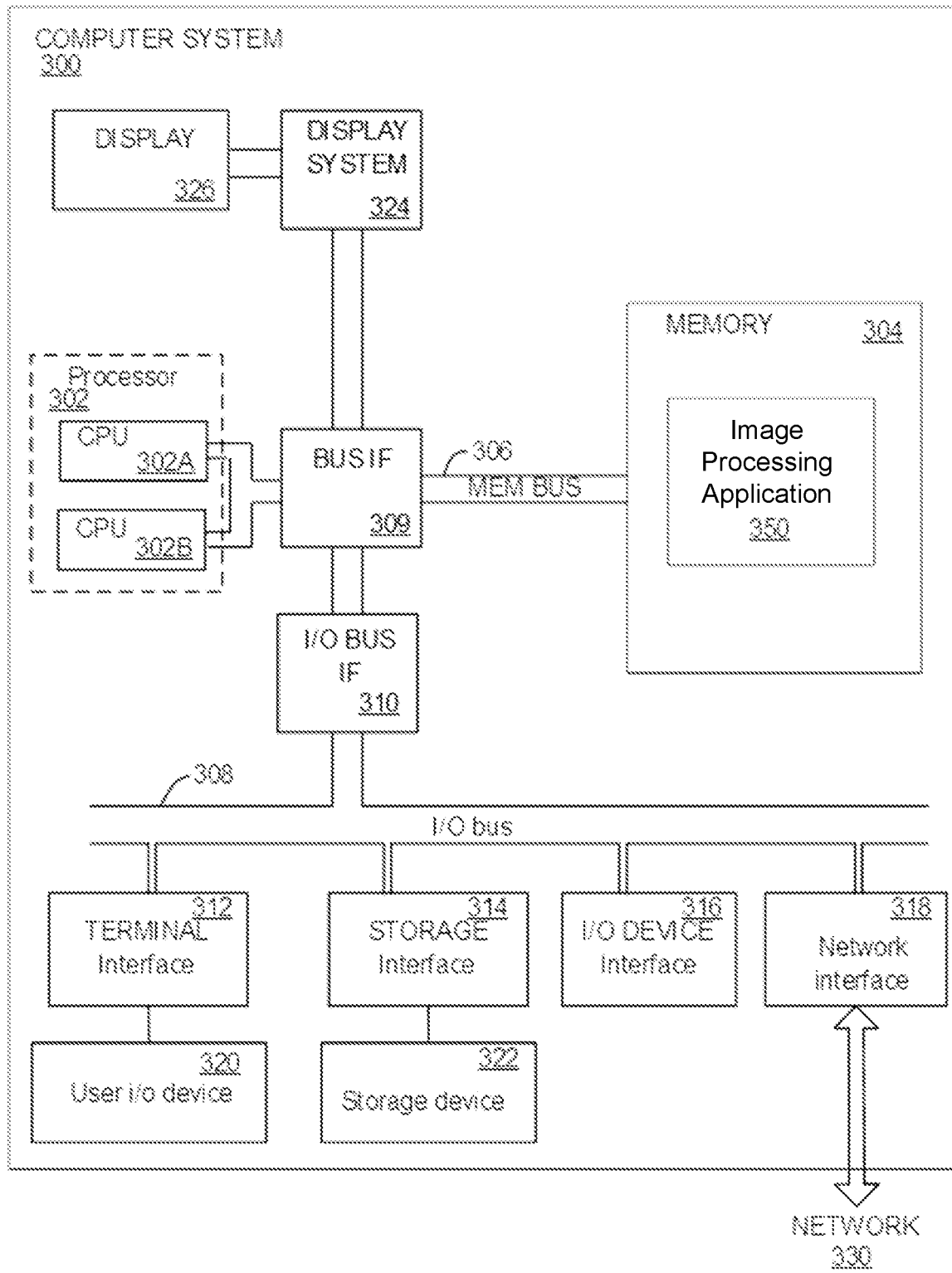
FIG. 1 is a diagram illustrating a computer system for implementing embodiments of the present invention.

Embodiments of the present invention will be described below with reference to the drawings. The embodiments are examples for describing the present invention, and omissions and simplifications are made where appropriate to clarify the description. The present invention may also be embodied in various other forms. Unless specifically limited, each component may be singular or plural.

In order to facilitate understanding of the present invention, the number, type, form, configuration, or the like of each component illustrated in the drawings may not be represented as the actual number, type, form, configuration, or the like. For this reason, the present invention is not necessarily limited to the number, type, form, configuration, or the like disclosed in the drawings.

In the case where there are a plurality of components having the same or similar functions, the description may be made by attaching different subscripts to the same reference numerals. Moreover, when it is not necessary to distinguish these multiple components, description may be performed with the subscripts omitted.

In the embodiments, devices, methods, and systems for performing the functions of the invention may be described, but the invention is not limited to these embodiments and may be implemented as a program by a computer. In this case, the computer executes the program by a processor (for example, a CPU or a GPU) and performs the processing defined by the program while using storage resources (for example, memory) or interface devices (for example, communication ports) or the like. Therefore, the subject of the processing performed by execution of the program may be the processor.

Similarly, the subject of the processing performed by execution of the program may be a controller, a device, a system, a computer, a node having a processor. The subject of the processing performed by execution of the program may be an arithmetic unit, and may include a dedicated circuit for performing a specific process. Here, the dedicated circuits are, for example, a Field Programmable Gate Array (FPGA), Application Specific Integrated Circuit (ASIC), Complex Programmable Logic Device (CPLD), or the like.

The program may also be installed on a computer from a program source. The program source may be, for example, a program distribution server or a computer readable storage medium. If the program source is a program distribution server, the program distribution server may include a processor and storage resources for storing the program to be distributed, and the processor of the program distribution server may distribute the program to be distributed to other computers. In addition, in the embodiments, two or more programs may be realized as one program, or one program may be realized as two or more programs.

(Hardware Configuration)

Referring first to FIG. 1, a computer system 300 for implementing the embodiments of the present disclosure will be described. The mechanisms and devices of the various embodiments disclosed herein may be applied to any suitable computing system. The main components of the computer system 300 include one or more processors 302, a memory 304, a terminal interface 312, a storage interface 314, an I/O (Input/Output) device interface 316, and a network interface 318. These components may be interconnected via a memory bus 306, an I/O bus 308, a bus interface unit 309, and an I/O bus interface unit 310.

The computer system 300 may include one or more general purpose programmable central processing units (CPUs), 302A and 302B, herein collectively referred to as the processor 302. In some embodiments, the computer system 300 may contain multiple processors, and in other embodiments, the computer system 300 may be a single CPU system. Each processor 302 executes instructions stored in the memory 304 and may include an on-board cache.

In some embodiments, the memory 304 may include a random access semiconductor memory, storage device, or storage medium (either volatile or non-volatile) for storing data and programs. The memory 304 may store all or a part of the programs, modules, and data structures that perform the functions described herein. For example, the memory 304 may store an image processing application 350. In some embodiments, the image processing application 350 may include instructions or statements that execute the functions described below on the processor 302.

In some embodiments, the image processing application 350 may be implemented in hardware via semiconductor devices, chips, logic gates, circuits, circuit cards, and/or other physical hardware devices in lieu of, or in addition to processor-based systems. In some embodiments, the image processing application 350 may include data other than instructions or statements. In some embodiments, a camera, sensor, or other data input device (not shown) may be provided to communicate directly with the bus interface unit 309, the processor 302, or other hardware of the computer system 300.

The computer system 300 may include a bus interface unit 309 for communicating between the processor 302, the memory 304, a display system 324, and the I/O bus interface unit 310. The I/O bus interface unit 310 may be coupled with the I/O bus 308 for transferring data to and from the various I/O units. The I/O bus interface unit 310 may communicate with a plurality of I/O interface units 312, 314, 316, and 318, also known as I/O processors (IOPs) or I/O adapters (IOAs), via the I/O bus 308.

The display system 324 may include a display controller, a display memory, or both. The display controller may provide video, audio, or both types of data to the display device 326. Further, the computer system 300 may also include a device, such as one or more sensors, configured to collect data and provide the data to the processor 302.

For example, the computer system 300 may include biometric sensors that collect heart rate data, stress level data, and the like, environmental sensors that collect humidity data, temperature data, pressure data, and the like, and motion sensors that collect acceleration data, movement data, and the like. Other types of sensors may be used. The display system 324 may be connected to a display device 326, such as a single display screen, television, tablet, or portable device.

The I/O interface unit is capable of communicating with a variety of storage and I/O devices. For example, the terminal interface unit 312 supports the attachment of a user I/O device 320, which may include user output devices such as a video display device, a speaker, a television or the like, and user input devices such as a keyboard, mouse, keypad, touchpad, trackball, buttons, light pens, or other pointing devices or the like. A user may use the user interface to operate the user input device to input input data and instructions to the user I/O device 320 and the computer system 300 and receive output data from the computer system 300. The user interface may be presented via the user I/O device 320, such as displayed on a display device, played via a speaker, or printed via a printer.

The storage interface 314 supports the attachment of one or more disk drives or direct access storage devices 322 (which are typically magnetic disk drive storage devices, but may be arrays of disk drives or other storage devices configured to appear as a single disk drive). In some embodiments, the storage device 322 may be implemented as any secondary storage device. The contents of the memory 304 are stored in the storage device 322 and may be read from the storage device 322 as needed. The I/O device interface 316 may provide an interface to other I/O devices such as printers, fax machines, and the like. The network interface 318 may provide a communication path so that computer system 300 and other devices can communicate with each other. The communication path may be, for example, the network 330.

In some embodiments, the computer system 300 may be a multi-user mainframe computer system, a single user system, or a server computer or the like that has no direct user interface and receives requests from other computer systems (clients). In other embodiments, the computer system 300 may be a desktop computer, a portable computer, a notebook computer, a tablet computer, a pocket computer, a telephone, a smart phone, or any other suitable electronic device.

Next, the configuration of the image processing system according to embodiments of the present invention will be described with reference to FIG. 2.

Figure 2:
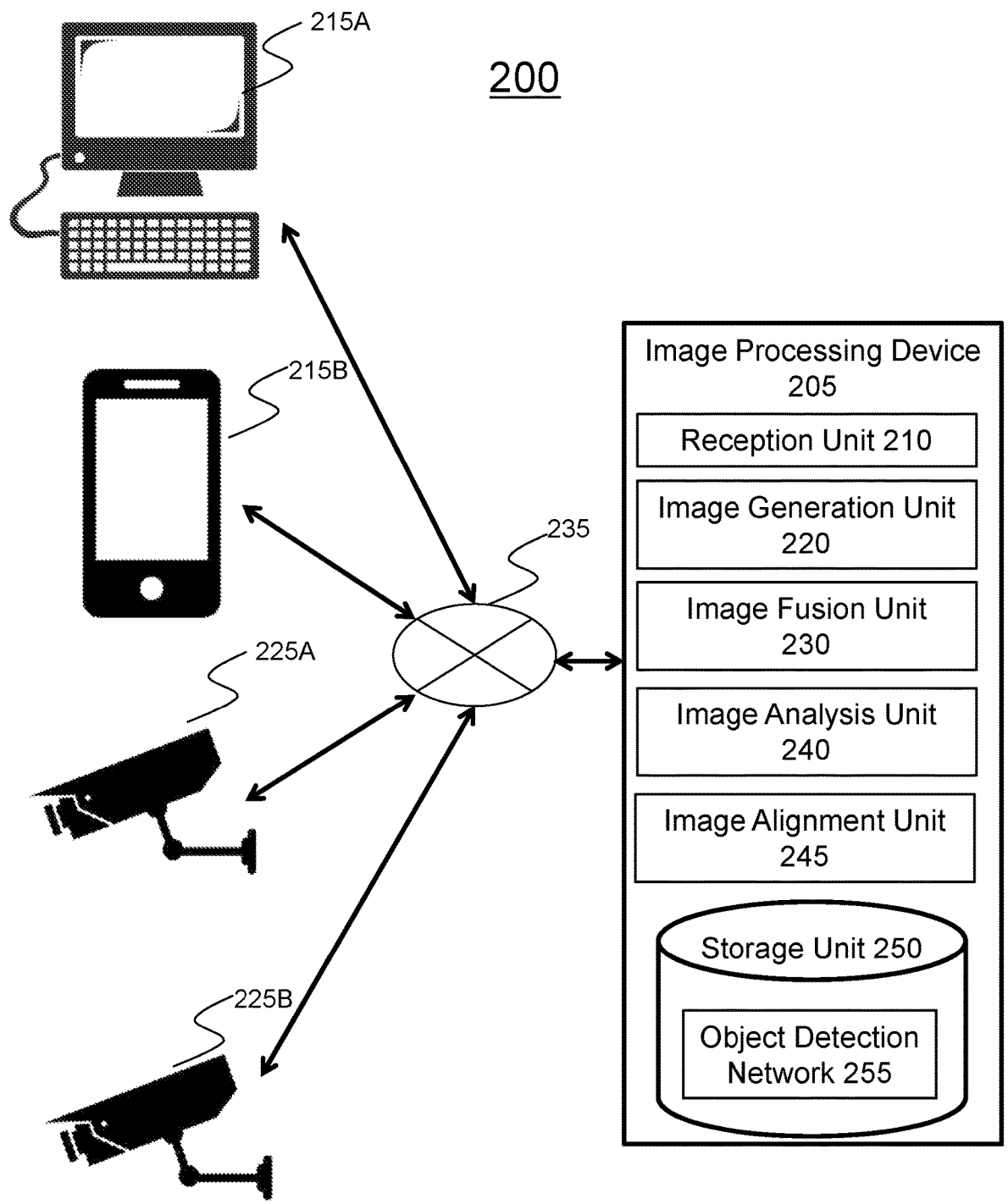
FIG. 2 is a diagram illustrating an example of a configuration of an image processing system according to embodiments of the present invention.

FIG. 2 is a diagram illustrating an example of the configuration of the image processing system 200 according to embodiments of the present invention. As illustrated in FIG. 2, the image processing system 200 primarily includes client terminals 215A, 215B, sensors 225A, 225B, a network 235, and an image processing device 205. The image processing device 205 is connected to the client terminals 215A, 215B and the sensors 225A, 225B via the network 235.

The client terminals 215A, 215B are terminals for requesting object detection processing to the image processing device 205. The client terminals 215A, 215B may transmit a message to the image processing device 205 that specifies the conditions for the object detection processing, and may receive object detection result information indicating the results of the object detection from the image processing device 205.

The client terminals 215A, 215B may be terminals used by individuals, or may be terminals in an organization such as a police station or a private company. In addition, the client terminals 215A, 215B may be any devices such as desktop computers, notebook computer, tablets, or smart phones.

The sensors 225A, 225B are devices that acquire information regarding natural phenomena and mechanical, electromagnetic, thermal, acoustical, and chemical properties of artificial objects, and convert the acquired information into information and signals having a format that is easy for humans and machines to manage. For example, the sensors 225A, 225B may be cameras for capturing target analysis images, such as RGB images and infrared images.

As illustrated in FIG. 2, the image processing system 200 may include two sensors 225A, 225B, but the present invention is not limited to this, and the number and type of the sensors may be appropriately selected according to the intended use of the image processing system 200. Accordingly, the sensors 225A, 225B may be the same type of sensor or may be mutually different sensors. For example, a configuration is possible in which the sensor 225A is a camera capable of acquiring an RGB image, and the sensor 225B is a camera for acquiring an infrared image.

Further, the image processing system 200 may be configured not only to have a configuration having two sensors as illustrated in FIG. 2, but also to have a configuration having a single sensor capable of acquiring a plurality of different types of images. By way of example, the image processing system 200 may include a sensor capable of dynamically switching between a mode for acquiring RGB images and a mode for acquiring infrared images.

The image processing device 205 is a device that performs object detection processing on a predetermined target image and accurately detects and identifies the objects in the target image. For example, the image processing device 205 may output information regarding the category and region of each object in the target image as a detection result.

As illustrated in FIG. 2, the image processing device 205 includes a reception unit 210, an image generation unit 220, an image fusion unit 230, an image analysis unit 240, an image alignment unit 245, and a storage unit 250 that stores an object detection network 255.

The reception unit 210 is a functional unit for acquiring a first M-channel image (for example, an RGB image) that serves as an image for training, and a second M-channel image (for example, an RGB image) and a second N-channel image (for example, an infrared image) that serves as a target analysis image. For example, the reception unit 210 may acquire the first M-channel image from a training image database (not illustrated in the Figures) prepared in advance, and may acquire the second M-channel image and the second N-channel image from the sensors 225A, 225B (or the client terminals 215A, 215B).

Here, M, N, and K are numbers representing the number of channels of an image, and are determined by the type of the image. M and N may be different numbers, or may be the same number depending on the type of image. For example, in the case of an RGB image, the number of channels is 3 (red, green, blue) and in the case of an infrared image, there is only one channel. In the following, examples will be described of a case in which the M channel image is an RGB three-channel image, the N-channel image is a one channel infrared image, and the K-channel image is a three-channel image obtained by fusing the RGB image and the N-channel image. However, the present invention is not limited to this, and the type and number of channels of the M-channel image and the N-channel image may be any type of image such as an RGB-D image, an X-ray image, or a thermal image.

The image generation unit 220 is a functional unit that generates a new N-channel image by converting an M-channel image into an N-channel image. The image generation unit 220 may be, for example, a generative adversarial network that includes a generator network configured to generate a candidate image for a first N-channel image based on the first M-channel image, and a discriminator network configured to compare the candidate image with the ground truth for the first N-channel image in order to determine the divergence of the candidate image with respect to the ground truth, and output, as the first N-channel image, a candidate image that satisfies a predetermined divergence criterion as the first N-channel image.

According to such a configuration, the image generation unit 220 may be trained to convert an image of a specific number of channels into an image of a different number of channels. As a result, the image generation unit 220 can input a three-channel image such as an RGB image, and convert the RGB image into a one-channel image such as an infrared image in order to generate a new infrared image.

The image fusion unit 230 is a functional unit that generates a K-channel image by fusing an M-channel image and an N-channel image. For example, the image fusion unit 230 can generate a K-channel image that includes both the features of an RGB image and the features of an infrared image by fusing an RGB image and an infrared image obtained by converting the RGB image into an infrared image generated by the image generation unit 220.

Here, in order to fuse the M-channel image and the N-channel image, the image fusion unit 230 may extract a color tone component from the M-channel image (the RGB image), extract an edge component and a gradation component from the N-channel image (the infrared image), and generate a K-channel image by fusing each of the extracted components.

By generating a fused image obtained by fusing an RGB image and an infrared image, for example, the image fusion unit 230 can generate an image with sharp contours and vivid colors even in an environment with low luminance.

The image analysis unit 240 is a functional unit that generates, using an object detection neural network trained using a first K-channel image, object detection result information with respect to a second K-channel image generated from a second M-channel image and a second N-channel image, and outputs the object detection result information. The detection result information output by the image analysis unit 240 may be information relating to the category and the spatial region (the coordinates or the like) of each object in the K-channel image.

The image alignment unit 245 is a functional unit for aligning the viewpoints of the M-channel image and the N-channel image with each other. The image alignment unit 245 can process the positions of the elements in the M-channel image and the N-channel image to be aligned with each other by adjusting the positions and angles of the received images using, for example, a predetermined rotation function and/or a translation function.

The storage unit 250 is a storage unit for storing the various data used by the above-described functional units. The storage unit 250 may store an object detection network 255 for detecting an object, for example, as illustrated in FIG. 2. The storage unit 250 may be an arbitrary storage medium such as a flash memory or a hard disk drive.

The object detection network 255 is a neural network model that performs object detection processing on the K-channel image generated by the image fusion unit 230, generates object detection result information, and outputs the object detection result information. Here, the object detection network 255 is trained by a training process illustrated in FIG. 3, which will be described later, and analyzes a target image by an inference process illustrated in FIG. 4.

The object-detection network 255 may be, for example, a convolutional neural network (CNN, R-CNN, Faster-RCNN, etc.).

It should be noted that the functional units described above may be implemented as software program modules or may be implemented as dedicated hardware. Also, in some embodiments, the functions described above may be implemented on hardware acceleration devices, such as a Graphics Processing Unit (GPU), a Field Programmable Gate Array (FPGA), or an Application Specific Integrated Circuit (ASIC).

According to the above-described configuration, by fusing images having different numbers of channels, and training a neural network using the fused images, excellent object detection results can be generated for images of environments under various lighting conditions.

Next, the flow of the training process in the image processing method according to the embodiments of the present invention will be described with reference to FIG. 3.

Figure 3:
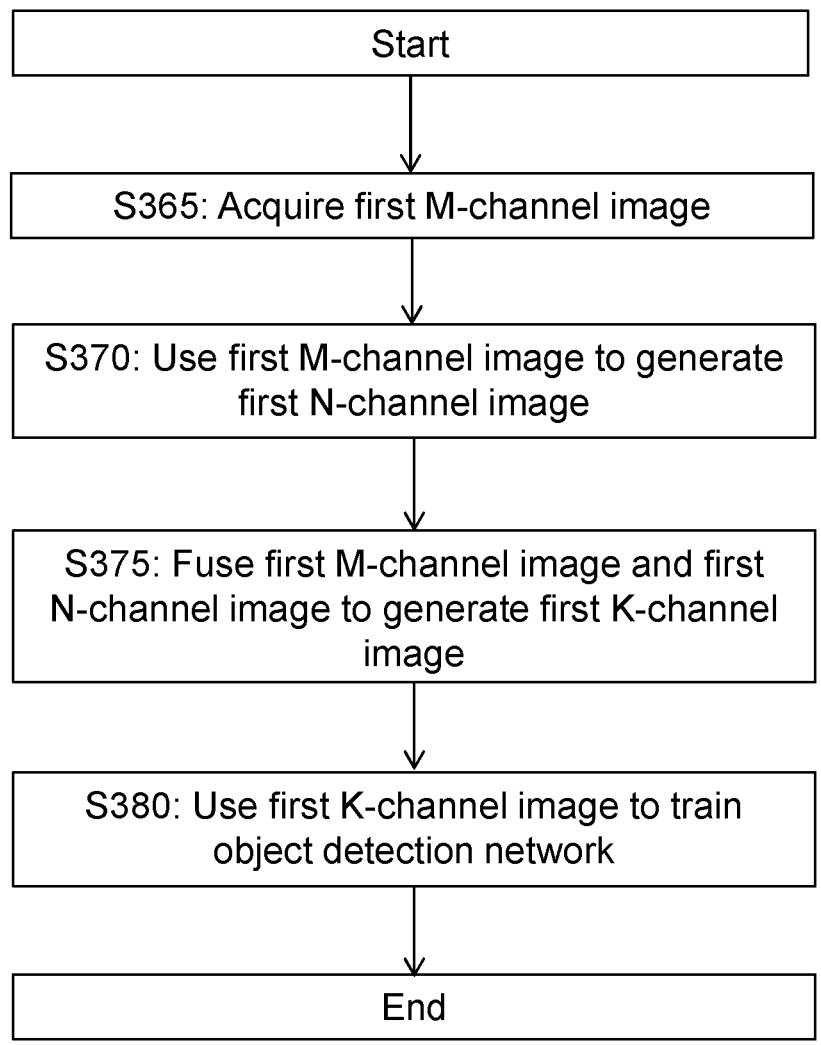
FIG. 3 is a diagram illustrating a flow of a training process in the image processing method according to embodiments of the present invention.

FIG. 3 is a diagram illustrating the flow of the training processing 360 in the image processing method according to the embodiments of the present invention; The training process 360 illustrated in FIG. 3 is a process for training the object detection network 255 illustrated in FIG. 2.

First, in Step S365, the reception unit (for example, the reception unit 210 of the image processing device 205 illustrated in FIG. 2) acquires a first M-channel image. The first M-channel image is, for example, a training image acquired from a training image database (not illustrated in the Figures) prepared in advance. As described above, the first M-channel image may be an image having an arbitrary number of channels, but for convenience of description, a case where the first M-channel image is an RGB image having three channels will be described below as an example.

Next, in Step S370, the image generation unit (for example, the image generation unit 220 of the image processing device 205 illustrated in FIG. 2) generates a first N-channel image using the first M-channel image acquired in Step S365. Here, the user may set the type and number of channels of the first N-channel image. For example, in a case where the user sets the first N-channel image as an infrared image having one channel, the image generation unit may generate, as the first N-channel image, an image obtained by converting the first M-channel image into an infrared image having one channel.

As described above, the image generation unit here may be a generative adversarial network including, for example, a generator network and a discriminator network. Details of the generative adversarial network will be described later.

Next, in Step S375, the image fusion unit (for example, the image fusion unit 230 of the image processing device 205 illustrated in FIG. 2) fuses the first M-channel image acquired in Step S365 and the first N-channel image generated in Step S370 to generate a first K-channel image. The image fusion unit here may be, for example, a convolutional neural network configured to extract features of an image. In this case, the image fusion unit may extract a first feature set from the first M-channel image, extract a second feature set from the first N-channel image, and then fuse the first feature set and the second feature set to generate the first K-channel image that includes the features of both the first N-channel image and the first M-channel image.

Next, in Step S380, the image analysis unit (for example, the image analysis unit 240 of the image processing device 205 illustrated in FIG. 2) trains the object detection network (for example, the object detection network 255 of the image processing device 205 illustrated in FIG. 2) using the K-channel image generated in Step S380. More specifically, after inputting the K-channel image, the object detection network performs object detection processing on the K-channel image, and outputs detection result information that includes information regarding the category and spatial region (the coordinates or the like) of each object in the K-channel image. Subsequently, the image analysis unit then calculates the loss of the object detection result with respect to the ground truth by comparing the detection result information with ground truth indicating the correct object detection result for the K-channel image. By back-propagating the calculated losses to the object detection network and optimizing the parameters of each layer of the object detection network to produce object detection results that are more similar to the ground truth, the object detection network can be trained to improve its object detection accuracy.

Next, the flow of the inference process in the image processing method according to the embodiments of the present invention will be described with reference to FIG. 4.

Figure 4:
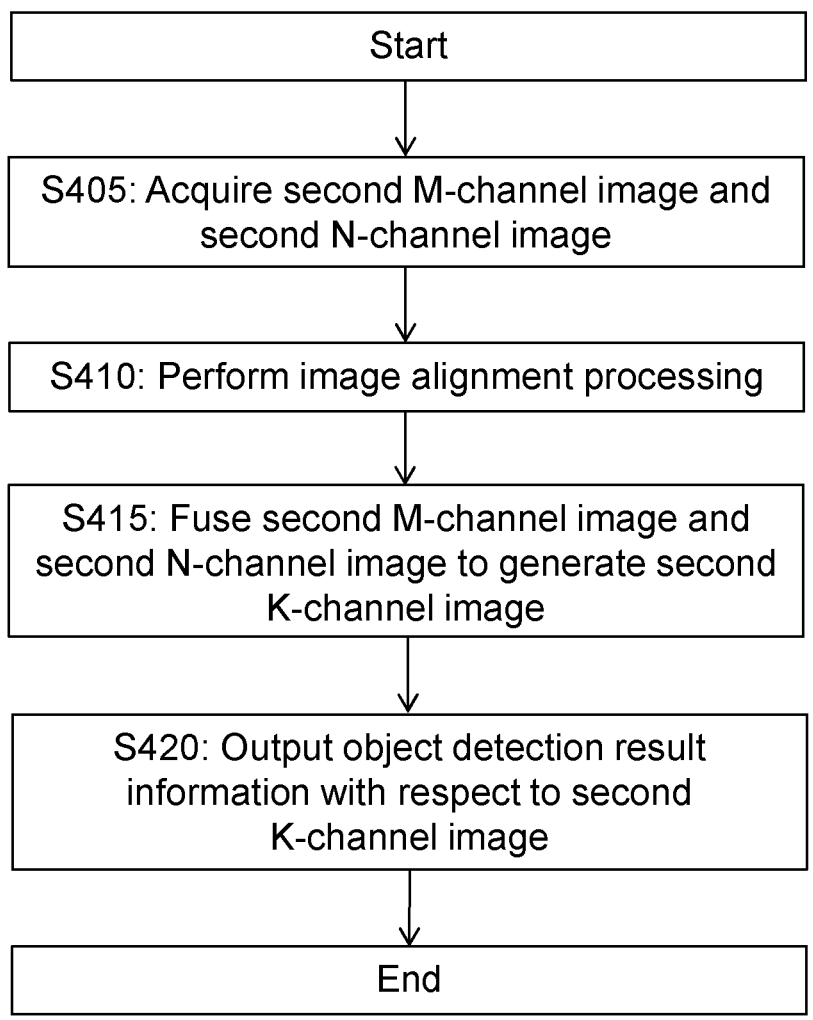
FIG. 4 is a diagram illustrating a flow of an inference process in the image processing method according to embodiments of the present invention.

FIG. 4 is a diagram illustrating the flow of the inference process 400 in the image processing method. The inference process 400 illustrated in FIG. 4 is a process for performing object detection on a target analysis image using the object detection network 255 trained by the training process 360 illustrated in FIG. 3.

First, in Step S405, the reception unit (for example, the reception unit 210 of the image processing device 205 illustrated in FIG. 2), acquires a second M-channel image and a second N-channel image. The second M-channel image and the second N-channel image are, for example, target analysis images on which object detection is performed, and are acquired from the client terminals 215A, 215B or the sensors 225A, 225B illustrated in FIG. 2. In addition, as described above, the second M-channel image and the second N-channel image may be images having an arbitrary number of channels, but for convenience of description, a case in which the second M-channel image is an RGB image having three channels and the second N-channel image is an infrared image having one channel will be described below as an example.

In addition, the compositions of the second M-channel image and the second N-channel image are substantially the same. For example, the second M-channel image and the second N-channel image may be an image of an RGB camera and an image of an infrared camera that capture the same subject at the same time.

Next, in Step S410, the image alignment unit (for example, the image alignment unit 245 of the image processing device 205 illustrated in FIG. 2) performs image alignment processing on the second M-channel image and the second N-channel image acquired in Step S405. The image alignment processing is processing in which the positions and angles of the second M-channel image and the second N-channel image are adjusted so that the positions of the elements in the second M-channel image and the second N-channel image are aligned with each other. More specifically, the image alignment unit may perform image alignment by performing a linear transformation such as a predetermined rotation function and a translation function.

Next, in Step S415, the image fusion unit (for example, the image fusion unit 230 of the image processing device 205 illustrated in FIG. 2) generates a second K-channel image by fusing the second M-channel image and the second N-channel image subjected to the image alignment processing in Step S410. The processing in this Step S415 substantially corresponds to that of Step S375 in the training process 360 described with respect to FIG. 3.

As an example, the image fusion unit may extract a first feature set from the second M-channel image, extract a second feature set from the second N-channel image, and then fuse the first feature set and the second feature set to generate a second K-channel image that includes the features of both the second N-channel image and the second M-channel image. Since the second K-channel image includes features of both the second N-channel image and the second M-channel image, detection results with higher accuracy can be generated as compared with the case where the second N-channel image and the second M-channel image are analyzed individually by the object detection network.

Next, in Step S420, the image analysis unit (for example, the image analysis unit 240 of the image processing device 205 illustrated in FIG. 2) performs object detection processing on the K-channel image generated in Step S415 using the object detection network 255 trained by the training process 360 illustrated in FIG. 3, and outputs the detection result information. The detection result information may be, for example, information regarding the category and spatial region (the coordinates or the like) of each object in the K-channel image. The image analysis unit may transmit the generated detection result information to the client terminals 215A, 215B illustrated in FIG. 2, for example.

By means of the inference process 400 described above, object detection accuracy can be improved by performing object detection on a target analysis image using an object detection neural network trained based on an image in which a plurality of types (or channel images) are fused.

Next, the logical configuration of the training phase of the image processing device according to embodiments of the present invention will be described with reference to FIG. 5.

Figure 5:
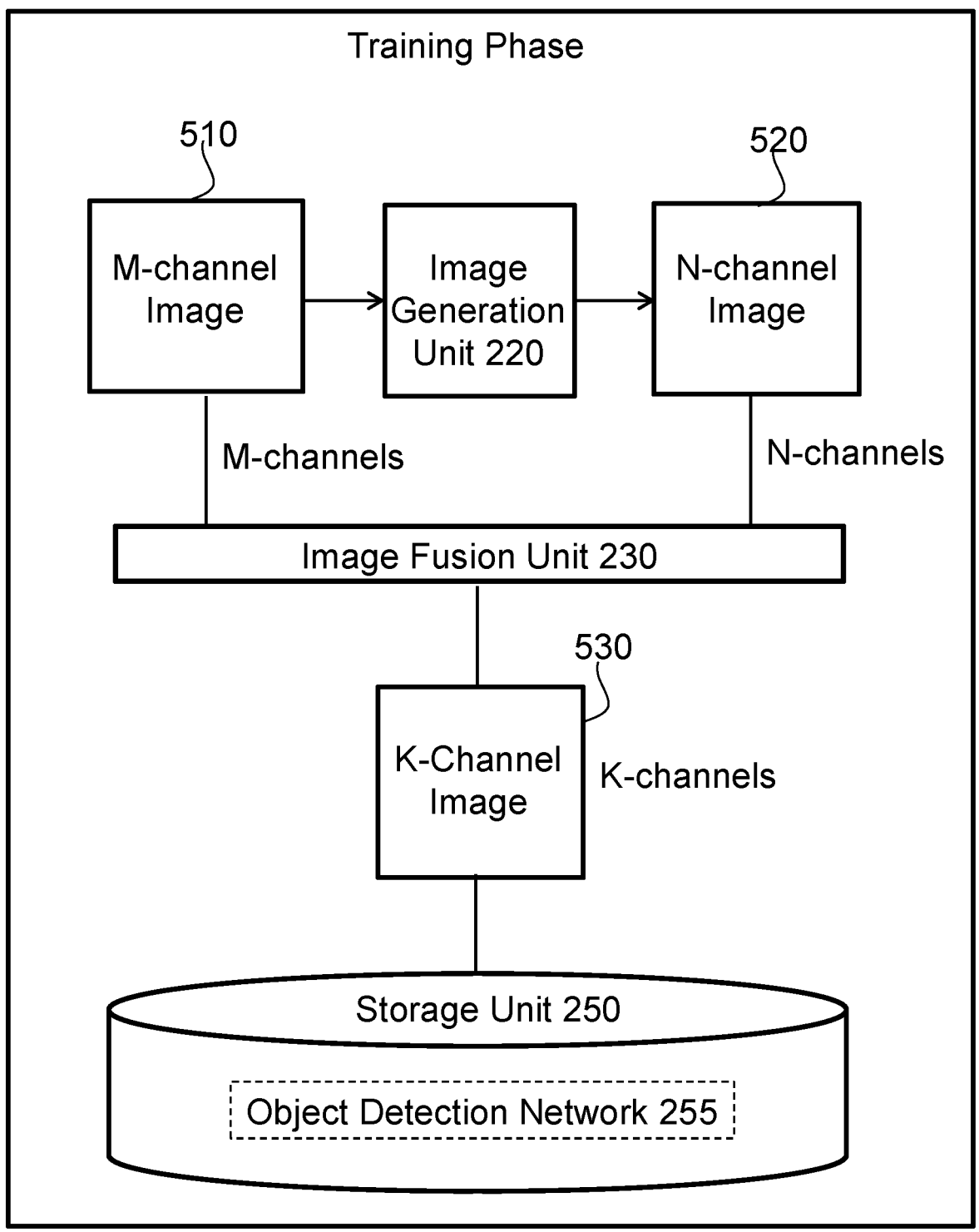
FIG. 5 is a diagram illustrating an example of the logical configuration of a training phase of the image processing device according to embodiments of the present invention.

FIG. 5 is a diagram illustrating an example of the logical configuration 500 of the training phase of the image processing device according to embodiments of the present invention. The logic configuration 500 illustrated in FIG. 5 corresponds to the training process 360 described with reference to FIG. 3.

In the training phase of the image processing device, first, a first M-channel image 510 acquired from a training image database or the like that was prepared in advance is supplied to the image generation unit 220. In the case that the image generation unit 220 is implemented as a generative adversarial network, this generative adversarial network has already been trained. Next, the image generation unit 220 generates a first N-channel image 520 obtained by converting the first M-channel image 510 into an N-channel image based on the input first M-channel image 510.

The first M-channel image 510 and the first N-channel image 520 generated by the image generation unit 220 are input to the image fusion unit 230. The image fusion unit 230 fuses the first M-channel image 510 and the first N-channel image 520 to generate a first K-channel image 530 that includes the features of both the first M-channel image 510 and the first N-channel image 520. The first K-channel image 530 is input to the object detection network 255. The object detection network 255 is composed of arithmetic units included in hardware such as CPUs, GPUs, FPGAs, and ASICs, and performs arithmetic operations based on information required for configuring the object detection network 255 that is called from the storage unit 250 in memory such as DRAM or SRAM. The object detection network 255 that inputs the first K-channel image 530 is trained end-to-end using the first K-channel image 530 as training data.

Next, the logical configuration of the inference phase of the image processing device according to the embodiments of the present invention will be described with reference to FIG. 6.

Figure 6:
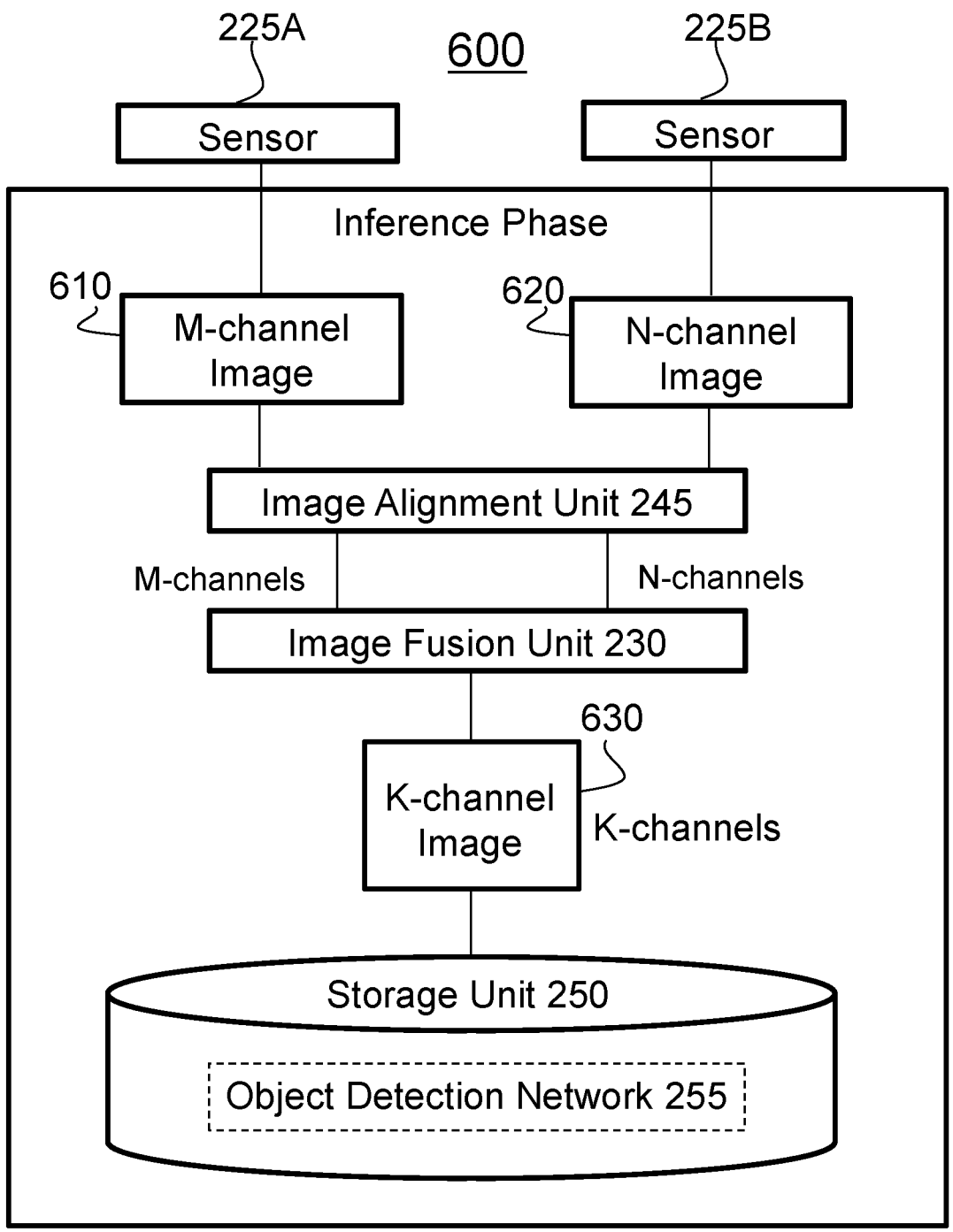
FIG. 6 is a diagram illustrating an example of the logical configuration of an inference phase of the image processing device according to embodiments of the present invention.

FIG. 6 is a diagram illustrating an example of the logical configuration 600 of the inference phase of the image processing device according to the embodiments of the present invention. The logical configuration 600 illustrated in FIG. 6 corresponds to the inference process 400 described with reference to FIG. 4.

In the inference phase, first, the reception unit (for example, the reception unit 210 illustrated in FIG. 2) acquires a second M-channel image 610 from the sensor 225A, and acquires a second N-channel image 620 from the sensor 225B. As described above, the second M-channel image 610 and the second N-channel image 620 are, for example, target analysis images on which object detection is to be performed and have substantially the same composition and include the same subject. In addition, in FIG. 6, the second M-channel image 610 is acquired by the sensor 225A and the second N-channel image 620 is acquired by the sensor 225B, but the present disclosure is not limited to this, and the second M-channel image 610 and the second N-channel image 620 may be acquired by the same sensor.

After acquiring the second M-channel image 610 and the second N-channel image 620, the image alignment unit 245 performs an image alignment process, adjusting the positions and angles of the second M-channel image 610 and the second N-channel image 620 so that the positions of the elements in the second M-channel image 610 and the second N-channel image 620 are aligned with each other. Subsequently, the image alignment unit 245 inputs the second M-channel image 610 and the second N-channel image 620 that were subjected to the image alignment processing to the image fusion unit 230.

The image fusion unit 230 fuses the second M-channel image 610 and the second N-channel image 620 to generate a second K-channel image 630 that includes features of both the second M-channel image 610 and the second N-channel image 620. The second K-channel image 630 is input to the object detection network 255 configured based on the information stored in the storage unit 250 as described above. The object detection network 255 that receives the second K-channel image 630 performs object detection processing on the second K-channel image 630 and outputs detection result information. The detection result information may be, for example, information regarding the category and spatial region (the coordinates or the like) of each object in the second K-channel image 630.

Next, an example in which the image processing device according to the embodiments of the present invention is applied to an RGB image and an infrared image will be described with reference to FIG. 7 to FIG. 8.

Figure 7:
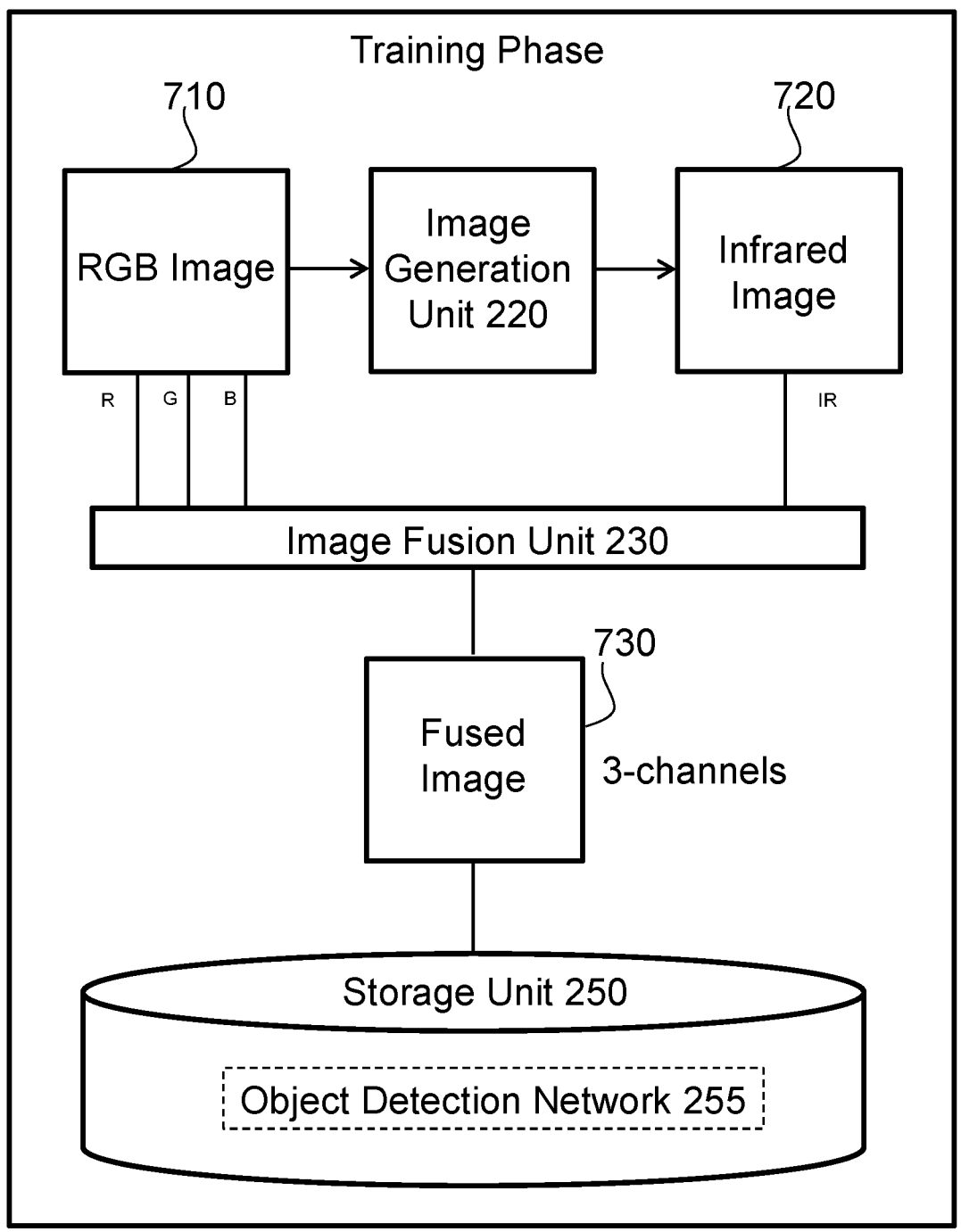
FIG. 7 is a diagram illustrating an example of the logical configuration of the training phase in a case that the image processing device according to the embodiments of the present invention is applied to an RGB image and an infrared image.

FIG. 7 is a diagram illustrating an example of the logical configuration 700 of the training phase in a case that the image processing device according to the embodiments of the present invention is applied to an RGB image and an infrared image.

As described above, in the image processing means according to the embodiments of the present invention, it is possible to increase the object detection accuracy by fusing images of different types and number of channels (for example, an M-channel image and an N-channel image), generating an image (a K-channel image) that includes the features of all the fused images, and using the fused image for object detection.

As an example, the image processing means according to the embodiments of the present invention can be applied to an RGB image and an infrared image. In general, in the case that the photography environment in which an image is captured is bright, an RGB camera can acquire detailed image information to accurately represent the environment. However, in the case that the photography environment is dark, the information that can be acquired by RGB cameras is limited, and the RGBs image acquired by an RGB camera may not accurately represent the photography environment.

In contrast, in comparison to RGB images, an infrared camera can acquire more detailed image information about a dark photography environment. Accordingly, by combining RGB and infrared images, and training an object detection network with images that include features of both RGB images and infrared images, it is possible to provide accurate object detection results for images captured under a variety of lighting conditions.

Hereinafter, a training phase in the case that the image processing device is applied to an RGB image and an infrared image will be described.

Since the logical configuration 700 illustrated in FIG. 7 substantially corresponds to the logical configuration 500 illustrated in FIG. 5, a redundant description thereof is omitted.

As illustrated in FIG. 7, first, a (first) RGB image 710 acquired from a training image database or the like (not illustrated in the Figures) prepared in advance is supplied to the image generation unit 220. Next, the image generation unit 220 generates an infrared image 720 obtained by converting the RGB image 710 into an infrared image based on the RGB image 710.

Subsequently, the RGB image 710 and the (first) infrared image 720 generated by the image generation unit 220 are input to the image fusion unit 230. The image fusion unit 230 fuses the RGB image 710 and the infrared image 720 to generate a three-channel fused image 730 that includes the features of both the RGB image 710 and the infrared image 720. The fused image 730 is input to an object detection network 255 configured based on the information stored in the storage unit 250. The object detection network 255 that receives the fused image 730 is trained end-to-end using the fused image 730 as training data. As a result, the object detection accuracy of the object detection network 255 is improved, and an excellent object detection result can be generated even in the case of an image captured under dark lighting conditions, for example.

Figure 8:
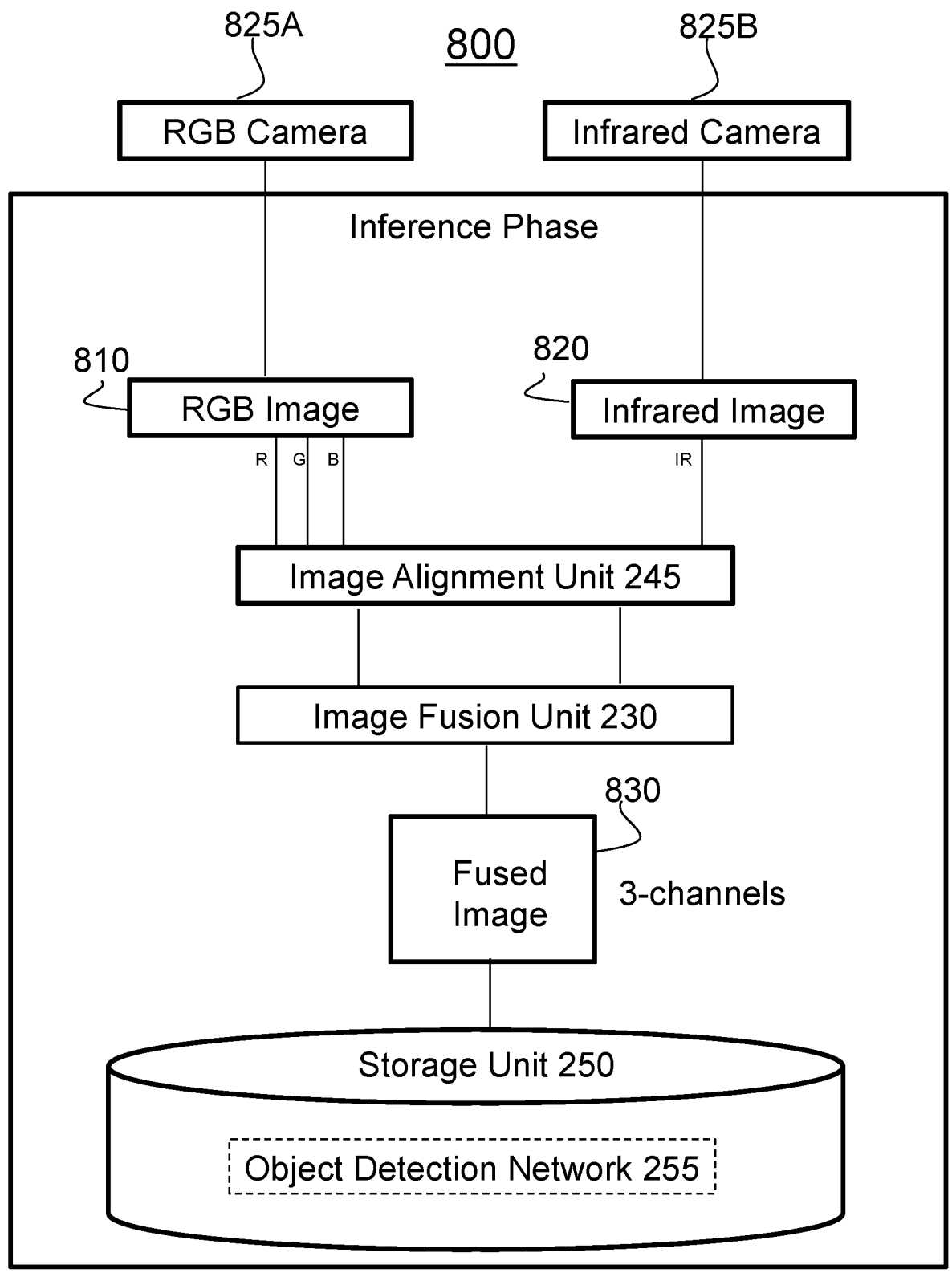
FIG. 8 is a diagram illustrating an example of the logical configuration of the inference phase in a case that the image processing device according to the embodiments of the present invention is applied to an RGB image and an infrared image.

FIG. 8 is a diagram illustrating an example of the logical configuration 800 of the inference phase in a case that the image processing device according to the embodiments of the present invention is applied to an RGB image and an infrared image.

FIG. 8 illustrates an example of a case in which an object detection process is performed on an image obtained by fusing an RGB image and an infrared image using an object detection network trained as illustrated in FIG. 7.

Since the logical configuration 800 illustrated in FIG. 8 substantially corresponds to the logical configuration 600 illustrated in FIG. 6, a redundant description thereof is omitted.

In the inference phase, first, the reception unit (for example, the reception unit 210 illustrated in FIG. 2) acquires a (second) RGB image 810 from the RGB camera 825A, and acquires a (second) infrared image 820 from the infrared camera 825B. As described above, the RGB image 810 and the infrared image 820 are, for example, target analysis images on which object detection is to be performed and have substantially the same composition and include the same subject. In addition, although FIG. 8 illustrates, as an example, a case in which the RGB image 810 is acquired by the RGB camera 825A and the infrared image 820 is acquired by the infrared camera 825B, the present invention is not limited thereto, and the RGB image 810 and the infrared image 820 may be acquired by a single sensor that can switch between an RGB camera mode and an infrared camera mode.

After acquiring the RGB image 810 and the infrared image 820, the image alignment unit 245 performs an image alignment process, adjusting the positions and angles of the RGB image 810 and the infrared image 820 so that the positions of the elements in the RGB image 810 and the infrared image 820 are aligned with each other. Subsequently, the reception unit inputs the RGB image 810 and the infrared image 820 that were subjected to the image alignment processing to the image fusion unit 230.

The image fusion unit 230 fuses the RGB image 810 and the infrared image 820 to generate a three-channel fused image 830 that includes the features of both the RGB image 810 and the infrared image 820. The fused image 830 is input to the object detection network 255 configured based on the information stored in the storage unit 250. The object detection network 255 that receives the fused image 830 performs object detection processing on the fused image 830 and outputs the detection result information. The detection result information may be, for example, information relating to the category and the spatial region (the coordinates or the like) of each object in the fused image 830.

As a result, an excellent object detection result can be generated even in the case of an image captured under dark lighting conditions, for example.

Next, an example of a case of using a feature extraction network in the image processing according to the embodiments of the present invention will be described with reference to FIG. 9 to FIG. 10.

Figure 9:
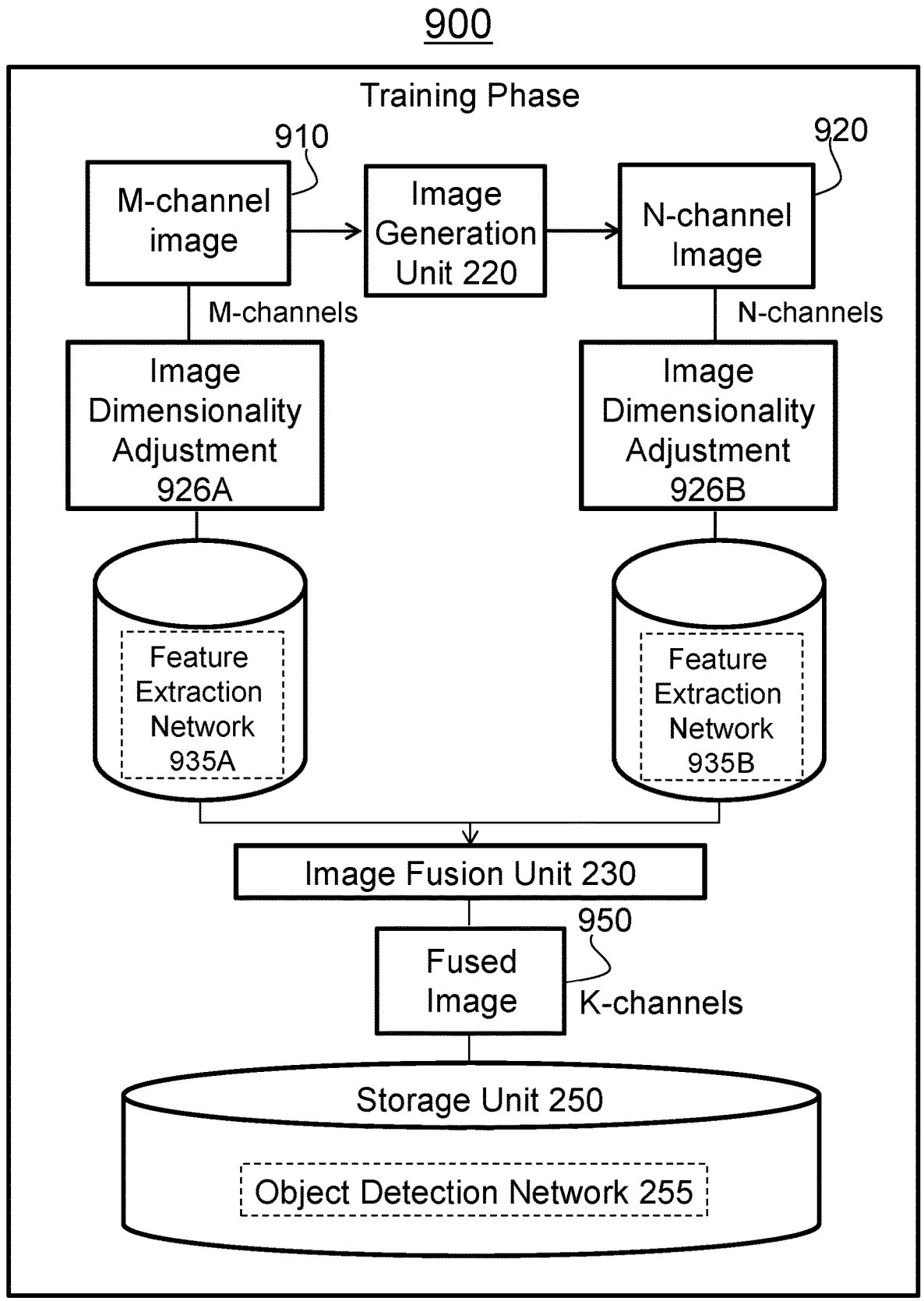
FIG. 9 is a diagram illustrating an example of the logical configuration of the training phase in a case that the image processing device according to the embodiments of the present invention includes a feature extraction network.

FIG. 9 is a diagram illustrating an example of a logical configuration 900 of a training phase in a case that the image processing device according to the embodiments of the present invention includes a feature extraction network.

As described above, the image processing device according to the embodiments of the present invention fuses a plurality of images (for example, RGB images and infrared images) of different types and numbers of channels to generate an image (a K-channel image) that includes the features of all the fused images, and uses the fused image for object detection. Therefore, in order to fuse images of different types and number of channels, the image processing device may use a feature extraction network to extract the features of each input image and fuse the extracted features, thereby generating a fused image that includes the features of all the input images.

Hereinafter, an example in which the image processing device performs image fusion using a feature extraction network will be described.

Since the logical configuration 900 illustrated in FIG. 9 substantially corresponds to the logical configuration 500 illustrated in FIG. 5, a redundant description thereof will be omitted.

As illustrated in FIG. 9, a (first) M-channel image 910 and a (first) N-channel image 920 generated by the image generation unit 220 based on the M-channel image 910 are acquired from a training image database or the like (not illustrated in the Figures) prepared in advance, and are subjected to image dimensionality adjustment 926A, B before being input to the feature extraction networks 935A, B. This image dimensionality adjustment 926A, B is a process for adjusting the dimensionality of the M-channel image 910 and the N-channel image 920 to a dimensionality that can be processed by the feature extraction networks 935A, B.

After the process of the image dimensionality adjustment 926A, B is completed, the M-channel image 910 is input to the feature extraction network 935A, and the N-channel image 920 is input to the feature extraction network 935B. Next, the feature extraction network 935A extracts a first feature set from the M-channel image 910, and the feature extraction network 935B extracts a second feature set from the N-channel image 920. Next, the first feature set and the second feature set extracted by the feature extraction networks 935A, B are input to the image fusion unit 230. Next, the image fusion unit 230 generates a K-channel image as the fused image 950 by fusing the first feature set and the second feature set.

Since the subsequent processing substantially corresponds to the processing of FIG. 5 and the like described above, the description thereof is omitted here.

Figure 10:
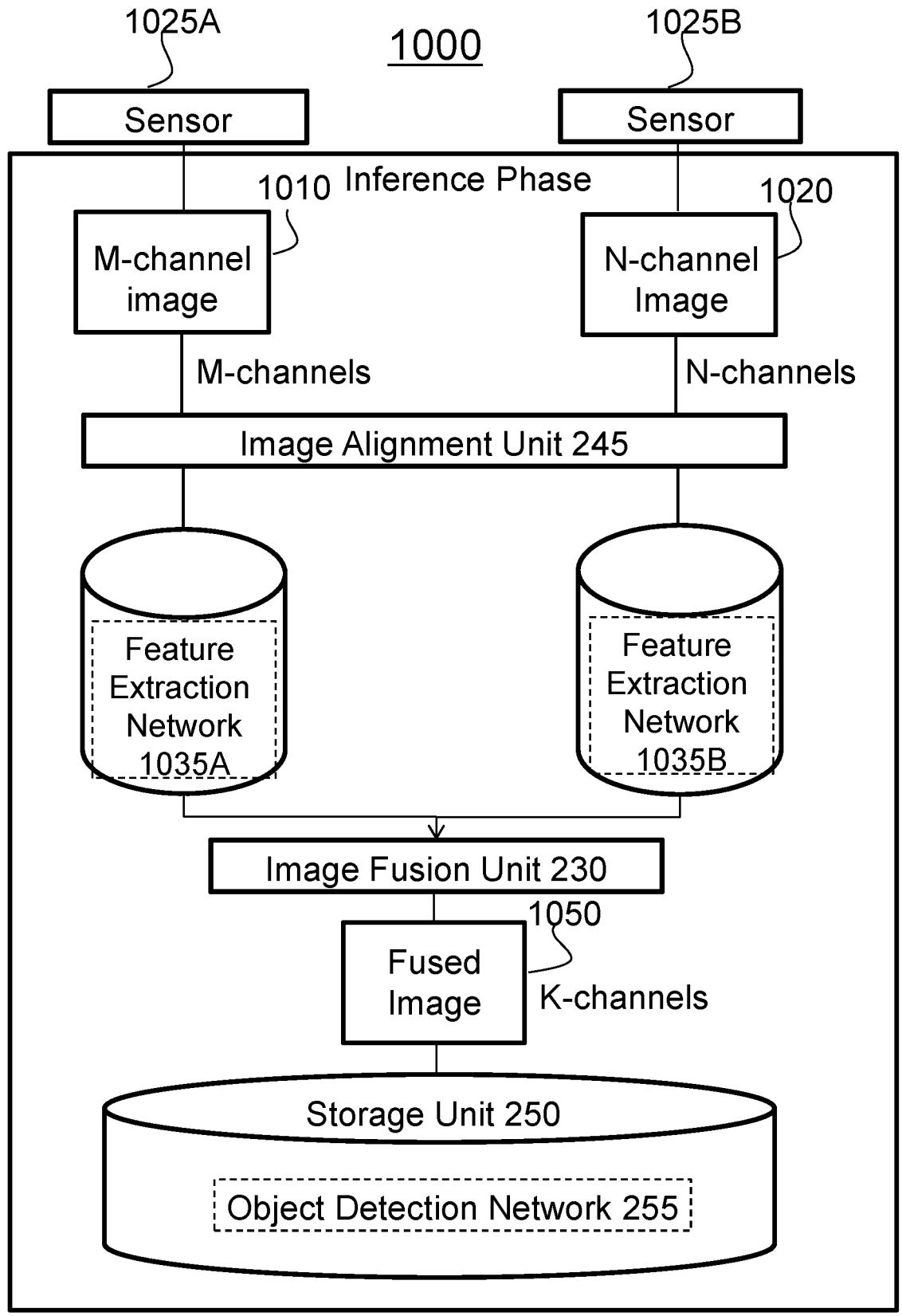
FIG. 10 is a diagram illustrating an example of the logical configuration of the inference phase in a case that the image processing device according to the embodiments of the present invention includes a feature extraction network.

FIG. 10 is a diagram illustrating an example of a logical configuration 1000 of the inference phase in a case that the image processing device according to the embodiments of the present invention includes a feature extraction network.

As illustrated in FIG. 10, in the inference phase, a second M-channel image 1010 acquired from the sensor 1025A and a second N-channel image 1020 acquired from the sensor 1025B are subjected to an image alignment process by the image alignment unit 245, and are then input to the feature extraction networks 1035A, B. As described above, the second M-channel image 1010 and the second N-channel image 1020 are, for example, images that have substantially the same composition and include the same subject.

Next, the feature extraction network 1035A extracts a first feature set from the second M-channel image 1010, and the feature extraction network 1035B extracts a second feature set from the second N-channel image 1035. Next, the first feature set and the second feature set extracted by the feature extracting networks 1035A, B are input to the image fusion unit 230. Next, the image fusion unit 230 generates a K-channel image as the target analysis fusion image 1050 by fusing the first feature set and the second feature set. Here, in order to fuse the first feature set and the second feature set, a predetermined existing feature fusion technique may be used.

Since the subsequent processing substantially corresponds to the processing of FIG. 6 and the like described above, the description thereof is omitted here.

Next, an example of a case of using a keypoint estimation module in the image processing according to the embodiments of the present invention will be described with reference to FIG. 11 to FIG. 12.

As described above, according to the present invention, it is possible to generate an excellent object detection result for images captured under a variety of lighting conditions by fusing images having different numbers of channels, and using these fused images to train a neural network for object detection. Therefore, by combining the image processing unit according to the embodiments of the present disclosure with a keypoint estimation module such as Openpose for estimating the keypoints of a human body such as the hands, head, feet, joints or the like, for example, even in cases in which an object such as a human is photographed in a dark photographing environment, the features of the human body can be accurately detected.

Figure 11:
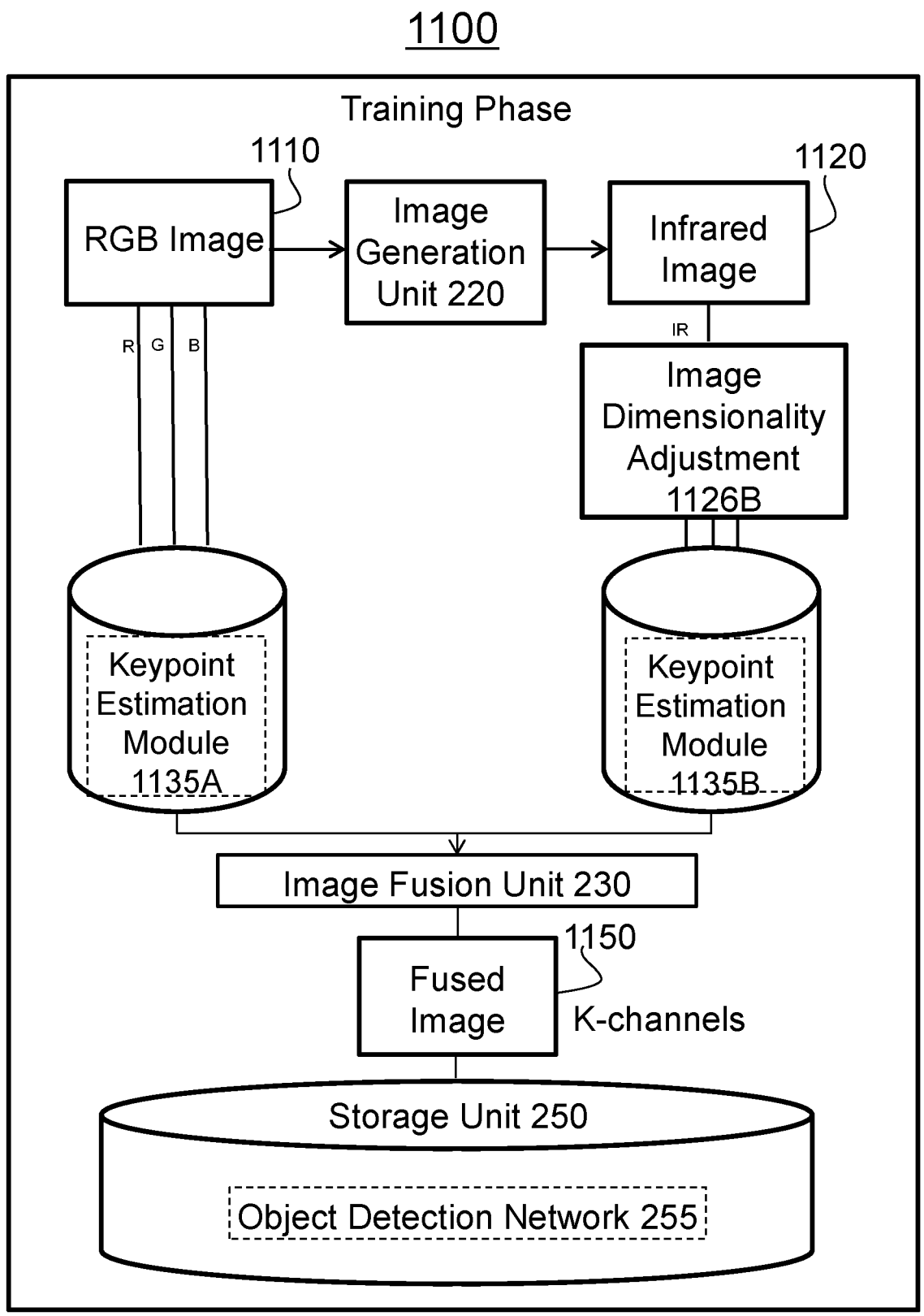
FIG. 11 is a diagram illustrating an example of the logical configuration of the training phase in a case that a keypoint estimation module is used in the image processing according to embodiments of the present invention.

FIG. 11 is a diagram illustrating an example of a logical configuration 1100 of a training phase in a case that a keypoint estimation module is used in image processing according to embodiments of the present invention.

As illustrated in FIG. 11, RGB images 1110 acquired from a training image database or the like (not illustrated in the Figures) prepared in advance are input to a keypoint estimation module 1135A (for example, an Openpose module). In addition, an infrared image 1120 generated by the image generation unit 220 based on the RGB image 1110 is subjected to an image dimensionality adjustment process, and is converted into a three-channel image accepted by a keypoint estimation module 1135B such as an Openpose module. Here, in order to convert the one-channel infrared image 1120 into a three-channel image, the information of the one channel of the infrared image may be copied into three channels.

Each of the keypoint estimation module 1135A that received the RGB image 1110 and the keypoint estimation module 1135B that received the infrared image detect the keypoints of the objects of the received image. For example, in a case that the subject of the image is a human, the hands, head, feet, joints, or the like of the human may be detected as the keypoints. Subsequently, the keypoints detected by the keypoint estimation module 1135A and the keypoint estimation module 1135B are input to the image fusion unit 230. Next, the image fusion unit 230 fuses the received keypoints to generate a K-channel image that includes both the keypoints of the RGB image 1110 and the infrared image 1120 as the fusion image 1150.

The image fusion unit 230 may be what is known as a Feature Fusion Network.

Further, since the subsequent processing substantially corresponds to the processing of FIG. 5 and the like described above, the description thereof is omitted here.

Figure 12:
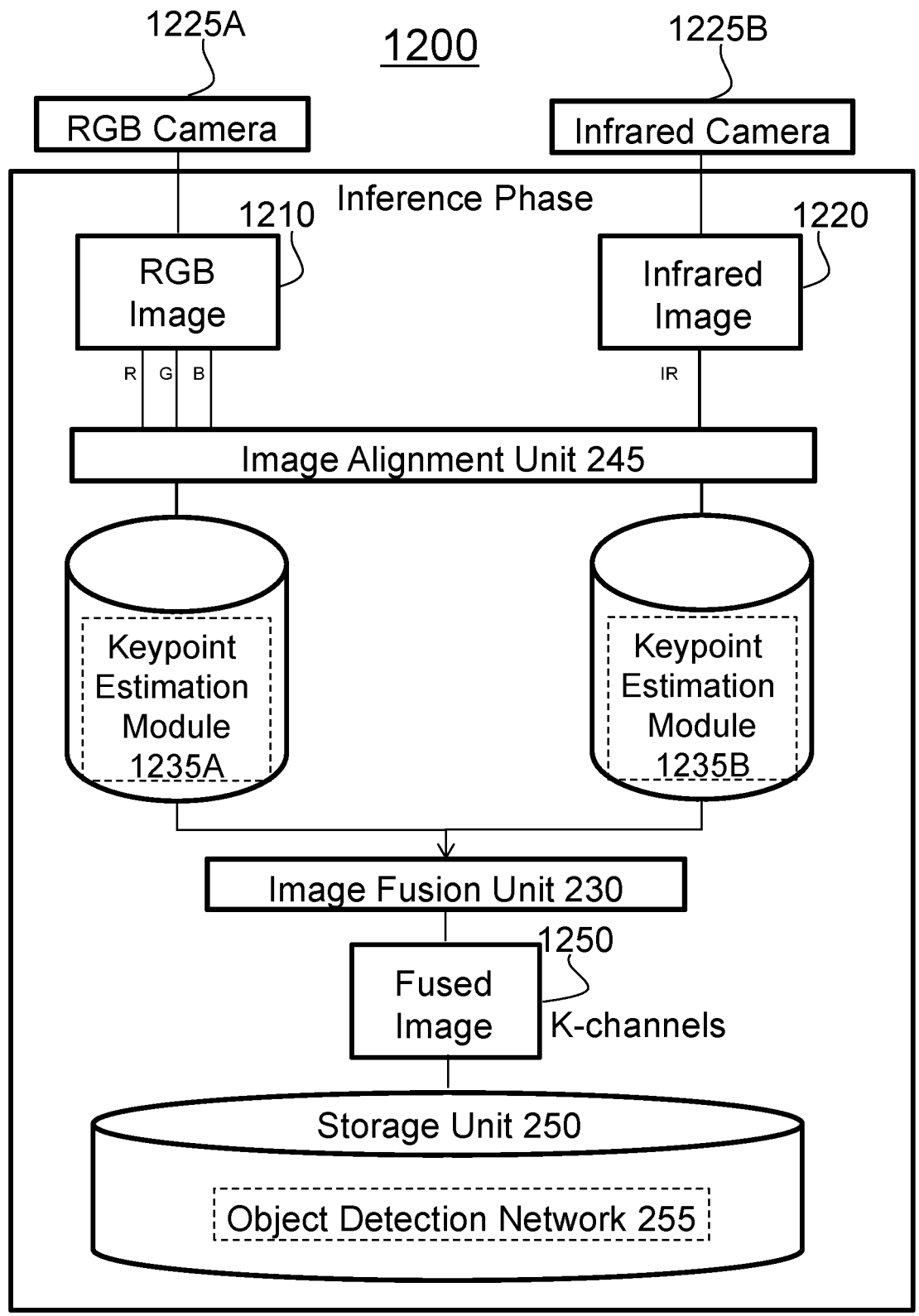
FIG. 12 is a diagram illustrating an example of the logical configuration of the inference phase in a case that a keypoint estimation module is used in the image processing according to embodiments of the present invention.

FIG. 12 is a diagram illustrating an example of the logical configuration 1200 of the inference phase in a case that a keypoint estimation model is used in the image processing according to embodiments of the present invention.

As illustrated in FIG. 12, in the inference phase, the RGB image 1210 acquired from the RGB camera 1225A and the infrared image 1220 acquired from the infrared camera 1225B are subjected to an image alignment process 1226, and then input to keypoint estimation modules 1235A, 1235B such as Openpose modules.

As described above, the RGB image 1210 and the infrared image 1220 are, for example, images that have substantially the same composition and include the same subject.

Next, each of the keypoint estimation module 1235A that received the RGB image 1210 and the keypoint estimation module 1235B that received the infrared image 1220 detect the keypoints of the object of the received image. Subsequently, the keypoints detected by the keypoint estimation module 1235A and the keypoint estimation module 1235B are input to the image fusion unit 230. Next, the image fusion unit 230 fuses the received keypoints to generate a K-channel image that includes both the keypoints of the RGB image 1210 and the infrared image 1220 as the fusion image 1250.

The object detection network 255 that received the fused image 1250 performs what is known as keypoint grouping processing, classifies the key points of the fused image 1250, and determines the optimal connections between the keypoints. For example, in the case that the subject of the fused image 1250 is a human, the object detection network 255 classifies the keypoints detected by the keypoint estimation modules 1235A, 1235B into categories such as a head, a right arm, a left hand, a left arm, a right hand, a torso, a left foot, a right foot, elbows, and knees. Subsequently, the object detection network 255 estimates the posture of the human which is the subject of the fused image 1250 based on the classified keypoints.

As described above, by combining the image processing unit according to the embodiments of the present disclosure with a keypoint estimation module such as a Openpose for estimating the keypoints of a human body such as the hands, head, feet, joints or the like, for example, even in cases in which an object such as a human is photographed in a dark photographing environment, the features of the human body can be accurately detected.

Next, an example of a case in which the image generation unit according to the embodiments of the present invention is implemented as a generative adversarial network will be described with reference to FIG. 13.

Figure 13:
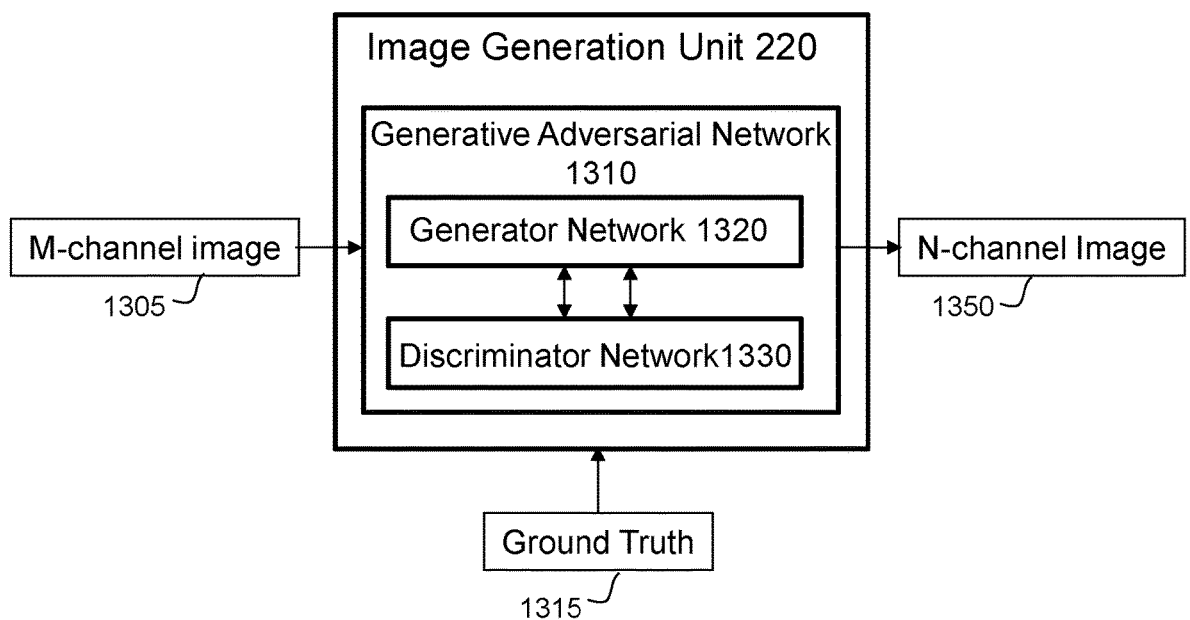
FIG. 13 is a diagram illustrating an example of a case where the image generation unit according to the embodiments of the present invention is implemented as a generative adversarial network.

FIG. 13 is a diagram illustrating an example of a case in which the image generation unit 220 according to the embodiments of the present invention is implemented as a generative adversarial network 1310. As illustrated in FIG. 13, the generative adversarial network 1310 includes a generator network 1320 and a discriminator network 1330. The generator network 1320 and the discriminator network 1330 may be convolutional neural networks, recurrent neural networks, autoencoders, or the like.

When an M-channel image (for example, an RGB image) 1305 is input, the generation network 1320 generates a candidate image of a desired N-channel image (for example, an infrared image) based on the M-channel image 1305, and transmits the candidate image to the discriminator network 1330.

Here, N may be set by a user, for example.

The discriminator network 1330 compares the received candidate image with the ground truth 1315 to determine the divergence of the candidate image from the ground truth. Here, the ground truth 1315 is a model image that illustrates the correct output in the case that the M-channel image 1305 is converted into an N-channel image.

In addition, the divergence described here is a measure quantitatively indicating the difference between the candidate image generated by the generator network 1320 and the ground truth, and may be calculated by an existing loss calculation method.

Next, after the discriminator network 1330 transmits the determined divergence as feedback to the generator network 1320, the generator network 1320 optimizes the parameters of each layer based on the divergence so as to generate candidate images more similar to the ground truth.

By repeating the processing described above, the generator network 1320 is trained, and candidate images with higher accuracy can be generated. Then, the discriminator network 1330 outputs, as the N-channel image 1350, a candidate image that satisfies a predetermined divergence criterion from among the candidate images generated by the generator network 1320.

The predetermined divergence criterion described here is, for example, a value indicating an allowable upper limit of the divergence, and an image satisfying a divergence equal to or less than the upper limit (that is, an image that has a high degree of similarity to the ground truth 1315), is output as the N-channel image 1350.

In this way, the image generation unit 240 can generate an N-channel image (for example, an infrared image) with high accuracy based on a predetermined M-channel image, such as RGB.

Next, the training method of the image generation unit according to embodiments of the present invention will be described with reference to FIG. 14.

Figure 14:
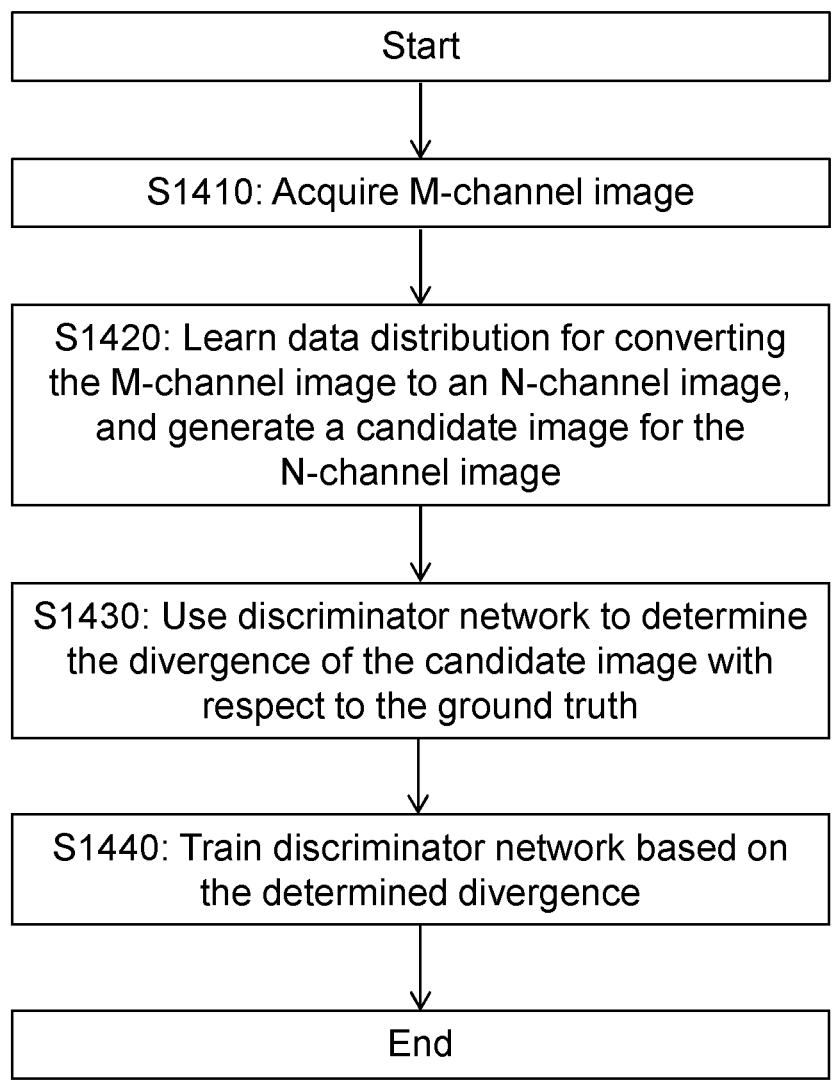
FIG. 14 is a diagram illustrating an example of the training method of the image generation unit according to embodiments of the present invention.

FIG. 14 is a diagram illustrating an example of the training method 1400 of the image generation unit according to the embodiment of the present invention. By executing the training method 1400 illustrated in FIG. 14, the image generation accuracy of the image generation unit is increased, and an N-channel image with higher accuracy can be generated.

First, in Step S1410, the generator network of the image generation unit acquires an M-channel image for training. The M-channel image for training may be acquired from a training image database prepared in advance, for example. As described above, the M-channel image for training may be, for example, a three-channel RGB image.

Next, in Step S1420, the generator network of the image generation unit learns the mapping of the data distributions for converting an M-channel image into a desired N-channel image based on the acquired M-channel image, and generates a candidate image of the N-channel image. The N-channel image described here may be set by a user, and may be, for example, a single channel infrared image.

Next, in Step S1430, the discriminator network of the image generation unit determines the divergence of the candidate image of the N-channel image generated in Step S1420 with respect to the ground truth. As described above, the ground truth described here is a model image that illustrates the correct output in the case that the M-channel image acquired in Step S1410 is converted into an N-channel image. The divergence described here is a measure that quantitatively indicates the difference between the candidate image generated by the generator network and the ground truth.

Next, in Step S1440, the divergence determined by the discriminator network is transmitted as feedback to the generator network. The generator network that receives this feedback optimizes the parameters of each layer based on the divergence so as to generate candidate images that are more similar to the ground truth.

Next, an image alignment unit according to the embodiments of the present invention will be described with reference to FIG. 15.

Figure 15:
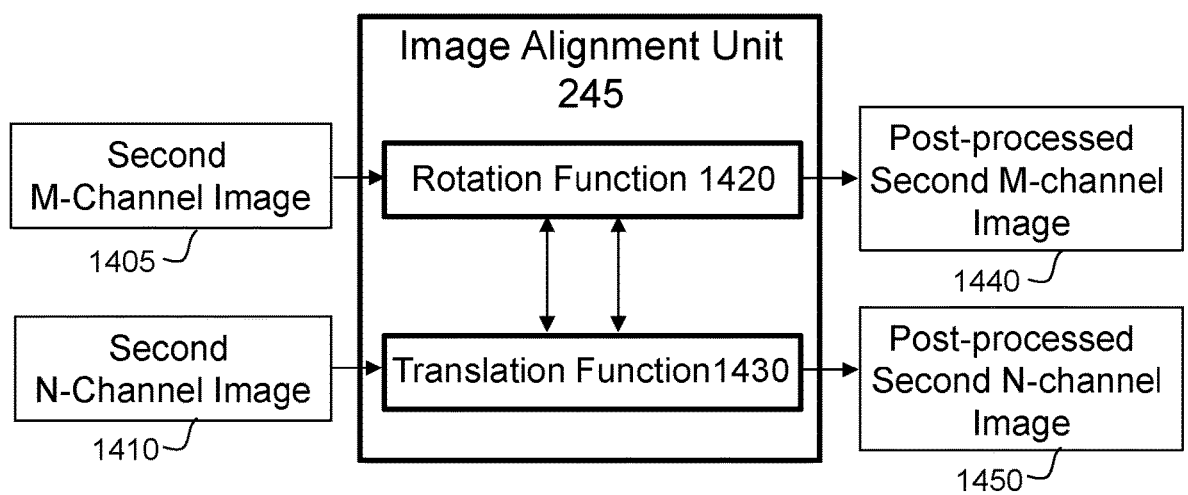
FIG. 15 is a diagram illustrating an example of an image alignment unit according to embodiments of the present invention.

FIG. 15 is a diagram illustrating an example of the image alignment unit 245 according to the embodiments of the present invention. As described above, in a case that the images input to the image processing device in the inference phase (the second M-channel image and the second N-channel image) are acquired from different sensors, the elements in each image may be displaced from each other due to the spatial relationship of the sensors. Accordingly, in the present invention, in order to correct this displacement, an image alignment unit 245 for adjusting the positions and angles of the received images so that the positions of the elements in the M-channel image and the N-channel image are aligned with each other is used.

Hereinafter, the image alignment unit 245 will be described.

As illustrated in FIG. 15, the image alignment unit 245 receives the second M-channel image 1405 and the second N-channel image 1410. The second M-channel image 1405 may be, for example, an RGB image acquired by an RGB camera in the inference phase. In addition, the second N-channel image may be, for example, an infrared image acquired by an infrared camera in the inference phase.

As described above, at this point, depending on the spatial relationship between the sensor that acquired the second M-channel image 1405 and the sensor that acquired the second N-channel image 1410, the viewpoints of the second M-channel image and the second N-channel image may be displaced from each other.

After acquiring the second M-channel image 1405 and the second N-channel image 1410, the image alignment unit 245 uses a predetermined rotation function 1420 and a translation function 1430 to adjust the position and angle of the second M-channel image 1405 and the second N-channel image 1410. The rotation function 1420 is a function for modifying the angle of the second M-channel image 1405 and/or the second N-channel image 1410, and the translation function 1430 is a function for changing the two-dimensional position of the second M-channel image 1405 and/or the second N-channel image 1410.

By utilizing the rotation function 1420 and/or the translation function 1430 as necessary, the image alignment unit 245 can adjust the position and angle of the second M-channel image 1405 and the second N-channel image 1410 to generate a post-processed second M-channel image 1440 and a post-processed second N-channel image 1450 for which the viewpoints have been aligned with each other. By transmitting the post-processed second M-channel image 1440 and the post-processed second N-channel image 1450 for which the viewpoints have been aligned with each other to the image fusion unit 230 described above, it is possible to generate a highly accurate fused image that includes the features of each respective image.

According to the image processing device, the image processing method, and the image processing system described above, it is possible to provide object detection results with high accuracy for images photographed under various lighting conditions by fusing a plurality of images of different types (for example, an RGB image and an infrared image), and performing object detection using an object detection neural network trained based on the fused image.

While embodiments of the present invention have been described above, the present invention is not limited to the above-described embodiments, and various changes can be made without departing from the spirit of the present invention.

REFERENCE SIGNS LIST

205 . . . Image processing device
210 . . . Reception unit
215A, B . . . Client terminal
220 . . . Image generation unit
225A, B . . . Sensor
230 . . . Image fusion unit
235 . . . Network
240 . . . Image analysis unit
245 . . . Image alignment unit
250 . . . Storage unit
255 . . . Object detection network

What is claimed is:
1. An image processing device comprising:
a storage unit configured to store an object detection neural network trained using a first K-channel image generated from a first M-channel image and a first N-channel image generated from the first M-channel image;
a reception unit configured to receive, from a sensor, a second M-channel image and a second N-channel image that include an identical subject;
an image analysis unit configured to generate, using the object detection neural network trained using the first

K-channel image, object detection result information with respect to a second K-channel image generated from the second M-channel image and the second N-channel image, and output the object detection result information; and an image generation unit for converting the first M-channel image into the first N-channel image, wherein the image generation unit is a generative adversarial network including:

a generator network configured to generate a candidate image for the first N-channel image based on the first M-channel image, and a discriminator network configured to:

compare the candidate image with ground truth for the first N-channel image in order to determine a divergence of the candidate image with respect to the ground truth, and output, as the first N-channel image, a candidate image that satisfies a predetermined divergence criterion, where K, M, and N are positive integers.

2. The image processing device according to claim 1, further comprising:

an image fusion unit configured to fuse an M-channel image and an N-channel image that include an identical subject to generate a K-channel image.

3. The image processing device according to claim 2, wherein:

the image fusion unit generates the K-channel image by fusing:

a first feature set extracted from the M-channel image; and a second feature set extracted from the N-channel image.

4. The image processing device according to claim 2, wherein:

the M-channel image and the N-channel image are selected from the group consisting of RGB images, RGB-D images, infrared images, X-ray images, and thermal images.

5. An image processing method comprising:

a step of acquiring a first M-channel image;

a step of generating a first N-channel image using the first M-channel image;

a step of fusing the first M-channel image and the first N-channel image to generate a first K-channel image;

a step of training an object detection neural network using the first K-channel image;

a step of acquiring a second M-channel image and a second N-channel image that include an identical subject;

a step of fusing the second M-channel image and the second N-channel image to generate a second K-channel image; and a step of generating, using the object detection neural network trained using the first K-channel image, object detection result information with respect to the second K-channel image, and outputting the object detection result information, wherein the step of generating the first N-channel image using the first M-channel image includes:

a step of generating a candidate image for the first N-channel image based on the first M-channel image;

a step of comparing the candidate image with ground truth for the first N-channel image in order to determine a divergence of the candidate image with respect to the ground truth; and a step of outputting, as the first N-channel image, a candidate image that satisfies a predetermined divergence criterion, where K, M, and N are positive integers.

6. The image processing method according to claim 5, wherein the step of fusing the first M-channel image and the first N-channel image to generate the first K-channel image includes:

a step of extracting a first feature set from the second M-channel image;

a step of extracting a second feature set from the second N-channel image; and a step of fusing the first feature set and the second feature set to generate the second K-channel image.

7. An image processing system comprising:

a client terminal;

a sensor; and an image processing device connected via a communication network; wherein the image processing device includes:

a storage unit configured to store an object detection neural network trained using a first K-channel image generated from a first M-channel image and a first N-channel image generated from the first M-channel image;

a reception unit configured to receive, from the sensor, a second M-channel image and a second N-channel image that include an identical subject; and an image analysis unit configured to generate, using the object detection neural network trained using the first K-channel image, object detection result information with respect to a second K-channel image generated from the second M-channel image and the second N-channel image, and output the object detection result information to the client terminal, wherein the image processing device further comprises:

an image generation unit for converting the first M-channel image into the first N-channel image, wherein the image generation unit is a generative adversarial network including:

a generator network configured to generate a candidate image for the first N-channel image based on the first M-channel image, and a discriminator network configured to:

compare the candidate image with ground truth for the first N-channel image in order to determine a divergence of the candidate image with respect to the ground truth, and output, as the first N-channel image, a candidate image that satisfies a predetermined divergence criterion, where K, M, and N are positive integers.

* * * * *